Figure 1A:
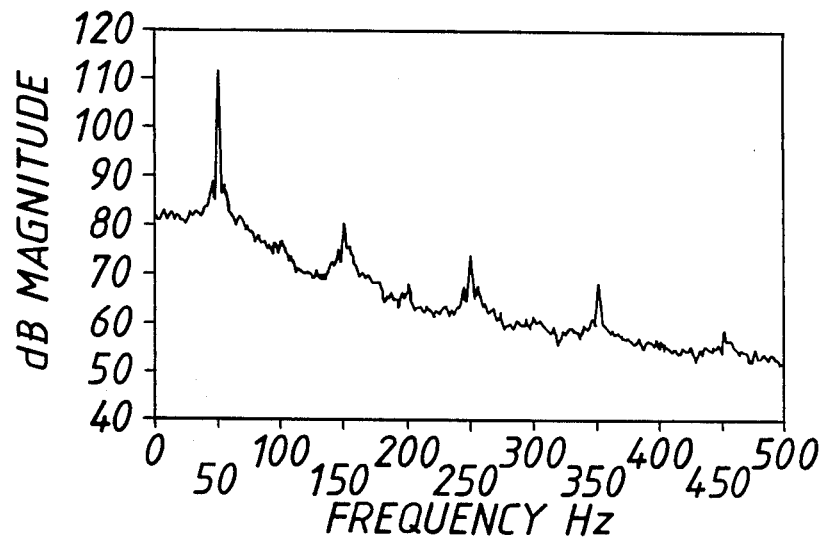

United States Patent [19]

Montgomery

[11] Patent Number: 4,852,119
[45] Date of Patent: Jul. 25, 1989

[54] ARC EXPOSURE MONITOR

[75] Inventor: Robert W. Montgomery, Laughton en le Morthern, Nr Sheffield, United Kingdom

[73] Assignee: British Steel plc, England

[21] Appl. No.: 271,285

[22] Filed: Nov. 15, 1988

[30] Foreign Application Priority Data

Nov. 25, 1988 [GB] United Kingdom ............... 8727532

[51] Int. Cl.⁴ ........................................... H05B 7/144
[52] U.S. Cl. ..................................... 373/49; 373/104
[58] Field of Search ...................... 373/47, 49, 50, 107, 373/108, 102, 105

[56] References Cited

U.S. PATENT DOCUMENTS 4,395,771 7/1983 Medova et al. ...................... 373/49
4,476,565 10/1984 Rashev et al. ....................... 373/50
4,683,577 7/1987 Bertthauer et al. ................ 373/105
4,701,932 10/1987 Bretthauer et al. ................ 373/104

Primary Examiner—Roy N. Envall, Jr.
Attorney, Agent, or Firm—Bacon & Thomas

[57] ABSTRACT

A method of monitoring the degree of exposure of an electric arc within a furnace having a molten charge, e.g. an arc furnace or ladle furnace, in which characteristic frequency spectra of the waveforms from the supply associated with (a) arc-exposure and (b) arc-submersion are predetermined and in which signals (e.g. indicative of the arc current) emitted during operation are measured and processed and a comparison effected with a set level established from these characteristic signals whereby to provide an indication of the degree of arc exposure.

The predetermined characteristic frequency spectra selected may be the harmonic content of the arc current.

10 Claims, 2 Drawing Sheets

EXPOSED ARC

SUBMERGED ARC

ARC EXPOSURE MONITOR

This invention relates to a method of, and apparatus for, monitoring the degree of exposure of an arc within a furnace, e.g. an electric arc furnace during meltdown of a charge.

The current trend in arc furnace technology is to use one or more furnaces solely as melting units, and to perform steelmaking operations in a secondary vessel. The output rates of the equipment are matched to the throughput of a continuous casting machine. Large cost savings can be achieved if the melting requirements can be met by a single arc furnace. Furnace throughput is therefore of primary importance, and can be the limiting factor in the productivity of the plant.

In order to achieve the highest output from an arc furnace, it is essential to use the full power capability of the transformer for as high a proportion of the melting time as is practical. However, large energy losses may be incurred unless precautions are taken to ensure that a high heat transfer efficiency from the arcs to the steel is maintained, particularly during the periods during and approaching melt-out.

To achieve high efficiency, a technique has been developed for submerging the arcs in a deep foaming slag, thus containing the arc energy and transferring it into the steel melt. The normal bath decarburisation by oxygen lancing will often produce a deep foaming slag, but if foaming is to be maintained throughout the heat it is usually necessary to spary carbon or other foam inducing materials on to the slag surface as the carbon boil subsides.

On other occasions, where the bath metallurgy demands a high iron oxide slag content, it is not practical to maintain a foaming slag, and a lower transformer tap must be selected to reduce the arc length.

It is clearly beneficial therefore, for the furnace operators to be made aware of the state of submersion/exposure of the arcs, so that they can take corrective action by spraying carbon, or by reducing the voltage tap.

The state of submersion/exposure of an arc is also of interest in operating ladle furnaces where it is important to 'bury' the arcs beneath the slag to prevent erosion of the refractory lining.

It is an object of this invention to monitor the degree of arc exposure for the purposes aforesaid.

From one aspect the present invention provides a method of monitoring the degree of exposure of an electric arc within a furnace having a molten charge, in which characteristic frequency spectra of the waveforms from the supply associated with (a) arc-exposure and (b) arcsubmersion are predetermined and in which the supply signals emitted during operation are measured and processed and a comparison effected with a set level established from said predetermined characteristic spectra whereby to provide an indication of the degree of arc exposure.

The predetermined characteristic frequency spectrum selected is the harmonic content of the arc current; the signal processing is effective to determine from the arc current waveform the ratio of the harmonic level to the fundamental (50 cycles)

Essentially, this invention is based on the recognition that arcs are more stable when immersed in a slag; the slag reduces the arc mobility, i.e. the tendency to flare out in different directions from beneath the electrode and causes the arc to restrike earlier in each mains cycle after each current zero. This in turn is reflected in the variation in the shape and amplitude of the arc current waveform.

This invention possesses the advantages that the measurements made are purely electrical (which is more reliable in the arc furnace environment than say acoustic monitoring), and no additional equipment for maintenance is required around the furnace. Further, each of the three arcs can be monitored independently, and while it is recognised that the three arc currents and their respective harmonics are not totally independent, it has been ascertained that the degree of harmonic content in each phase reflects the relative degree of arc exposure/submersion in that phase.

Figure 1B:
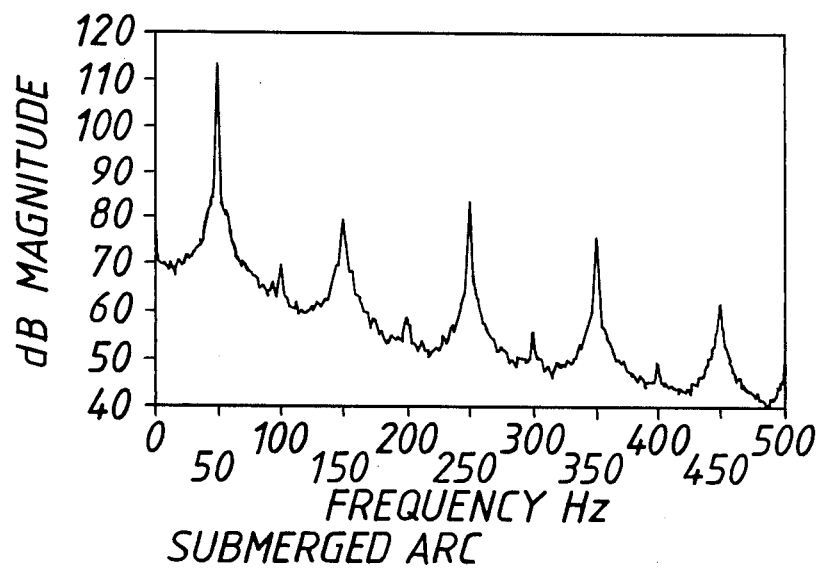
Figure 2:
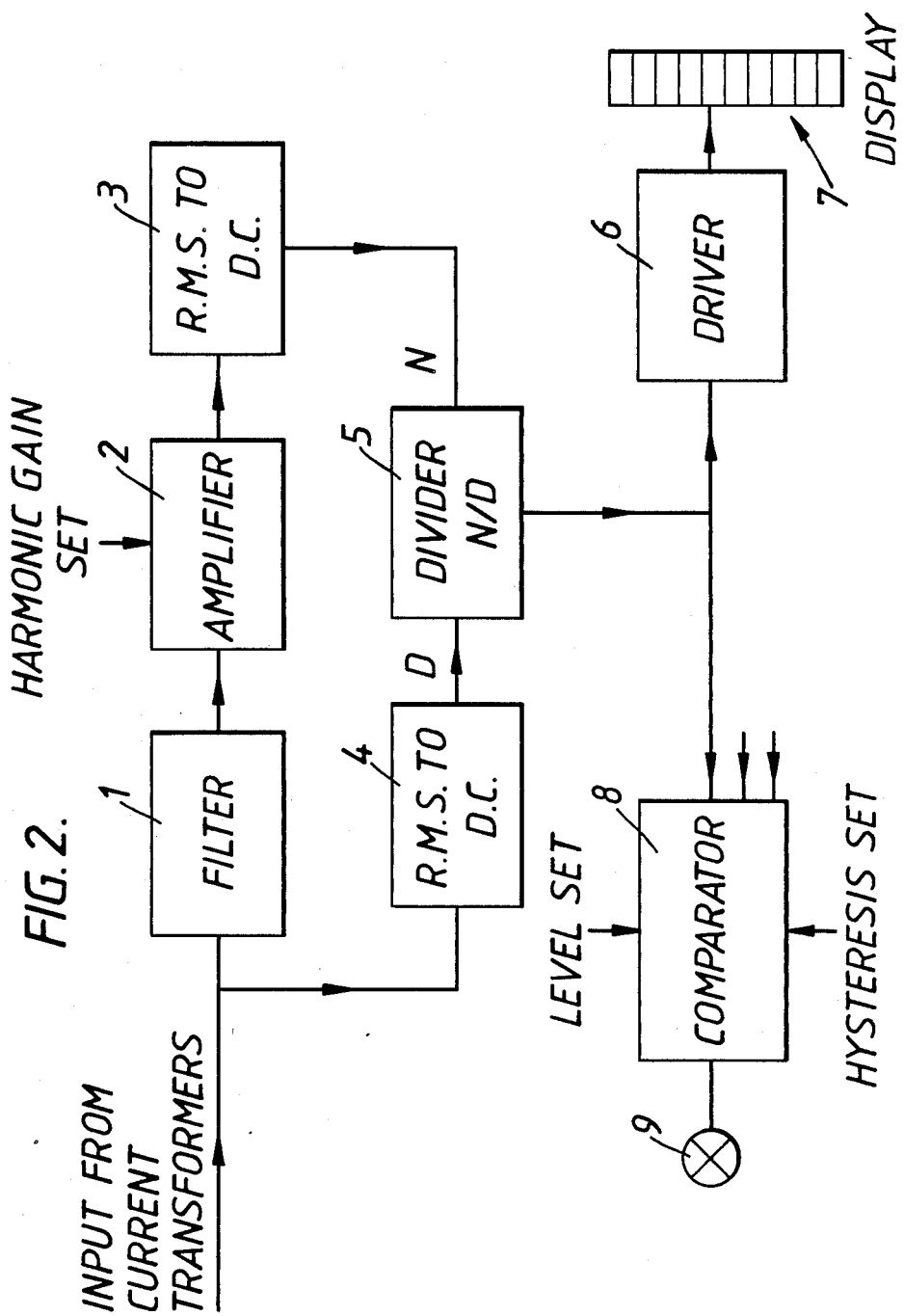

In order that the invention may be fully understood, one embodiment thereof will now be described, by way of example, with reference to the accompanying drawings, in which:

FIGS. 1(a) and 1(b) illustrate the frequency analysis of arc current waveforms applicable to an exposed arc and a submerged arc, respectively, and FIG. 2 is a block diagram of the apparatus for performing the method of the invention.

Referring to FIG. 1 the broad band frequency spectra of arc currents derived from existing current transformers in the furnace instrumentation are determined with exposed arcs - identified by visual and acoustic observations - and with submerged arcs. Both spectra illustrate the marked presence of third harmonics, and others to a lesser extend, which are indicative of the non-sinusoidal nature of the arc current waveform and the hesitancy of the arc to re-strike at current zero. As can be seen the significant difference between FIGS. 1(a) and 1(b) is the larger area beneath the exposed arc spectrum in the former case.

Considering now the apparatus shown in FIG. 2 the current signals, whose frequency spectra is typified in FIGS. 1(a) and/or (b), are applied to a high pass filter 1 to isolate the 50 cycle mains component and other low frequency components, amplified in an amplifier 2 and then converted in a circuit 3 to an equivalent r.m.s. dc signal. Likewise the 'unmodified' input signal is applied direct to a circuit 4 which again provides an equivalent r.m.s. dc signal, the two d.c. signals then being ratioed in a divider 5, the output from which is thus a signal representing the fractional harmonic content of the current.

This output signal is applied on the one hand to a 'driver' circuit 6 which operates a bar graph display 7 by which the fractional harmonic content is illuminated at the appropriate level and on the other hand to a comparator 8 to which a preset level signal is applied which, if exceeded by the d.c. signal input, illuminates an 'arc exposed' lamp 9. Like signals from the other phases are similarly applied to the comparator and the channel or channels which illuminate the lamp is/are readily identifiable on the display 7.

A 'hysteresis set' or damping signal is applied to the comparator to minimise spurious illumination of the lamp.

In operation illumination of the lamp may typically initiate carbon spraying on the melt to foam the slag and submerge the arc again; alternatively if carbon spraying is inappropriate a reduction in the voltage tap will achieve arc submersion.

Although the invention has been described with reference to the specific embodiment illustrated it is to be understood that various modifications may readily be made without departing from the scope of this invention, e.g. clearly other circuit configurations and indications of arc exposure/submersion may readily be adopted. Further a like system based on the measurement of arc voltage may be used but this parameter (arc voltage) cannot be measured directly; the system based on current is simpler.

We claim:

1. A method of monitoring the degree of exposure of an electric arc within a furnace having a molten charge, comprising: predetermining characteristic frequency spectra of the waveforms from the supply associated with arc exposure and arc submersion, respectively, measuring the supply signals emitted during operation of the electric arc within the furnace, processing said supply signals and comparing said processed signals with a set level established from said predetermined characteristic spectra whereby to provide an indication of the degree of arc exposure.

2. A method according to claim 1, wherein the characteristic frequency spectrum is the harmonic content of the arc current.

3. A method according to claim 2, wherein the measuring and processing are effective to provide a signal indicative of the fractional harmonic content of the current.

4. A method according to claim 3, further comprising deriving the supply signals from current transformers associated with the furnace supply.

5. A method according to claim 4, further comprising directly converting a portion of said supply signals to an equivalent dc level in a first circuit and initially filtering another portion of said supply signals through a high pass filter and subsequently converting the filtered signals to an equivalent dc level in a second circuit and applying said equivalent dc levels to a ratioing circuit to derive said signal indicative of the fractional harmonic content.

6. A method according to claim 5, wherein the harmonic content is the third harmonic.

7. A method according to claim 6, further comprising automatically initiating control action to effect submersion of the arc when the degree of arc exposure exceeds a specified level.

8. Apparatus for monitoring the degree of exposure of an electric arc within a furnace having a molten charge, comprising a first circuit in which alternating signals derived directly from the furnace supply are converted to an euqivalent dc level, a second circuit in which said signals are transmitted through a high pass filter and subsequently converted to an equivalent dc level, a divider for ratioing the said dc signals and a comparator for comparing the ratioed output with a set level established from characteristic frequency spectra of the waveforms of said alternating signals associated with (a) arc exposure and (b) arc submersion, whereby, when said set level is exceeded, an indication is provided of the degree of arc exposure.

9. Apparatus according to claim 8, in which the characteristic frequency spectra selected is the harmonic content of the arc current, and in which the ratioed output is indicative of the fractional harmonic content of alternating current signals derived from the supply.

10. Apparatus according to claim 9, applicable to a three electrode furnace, the ratiod outputs from each arc monitored being applied in common to said comparator whereby an indication is provided of the degree of arc exposure associated with any one of said electrodes.

* * * * *